(12) United States Patent
Mathew et al.

(10) Patent No.: US 9,129,646 B2
(45) Date of Patent: Sep. 8, 2015

(54) ARRAY-READER BASED MAGNETIC RECORDING SYSTEMS WITH MIXED SYNCHRONIZATION

(71) Applicant: LSI Corporation, San Jose, CA (US)

(72) Inventors: George Mathew, San Jose, CA (US); Nayak Ratnakar Aravind, Allentown, PA (US); Suharli Tedja, San Ramon, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 103 days.

(21) Appl. No.: 14/031,990

(22) Filed: Sep. 19, 2013

(65) Prior Publication Data

US 2015/0070796 A1  Mar. 12, 2015

Related U.S. Application Data

(60) Provisional application No. 61/875,013, filed on Sep. 7, 2013.

(51) Int. Cl.
*G11B 5/00* (2006.01)
*G11B 20/10* (2006.01)
*G11B 5/09* (2006.01)
*G11B 5/012* (2006.01)

(52) U.S. Cl.
CPC .......... *G11B 20/10046* (2013.01); *G11B 5/012* (2013.01); *G11B 5/09* (2013.01); *G11B 20/10009* (2013.01); *G11B 20/10222* (2013.01); *G11B 20/10527* (2013.01)

(58) Field of Classification Search
None
See application file for complete search history.

(56) References Cited

U.S. PATENT DOCUMENTS

| | | |
|---|---|---|
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 13/529,572, Jun. 21, 2012, Yang et al.

(Continued)

*Primary Examiner* — Muhammad N Edun
(74) *Attorney, Agent, or Firm* — Hamilton DeSanctis & Cha

(57) ABSTRACT

A magnetic recording system includes an array of analog inputs operable to receive an array of analog signals retrieved from a magnetic storage medium, where one of the array of analog signals corresponds with a reference channel, a timing recovery circuit operable to generate a clock signal based on the analog signal for the reference channel, a number of analog to digital converters each operable to sample one of the array of analog signals based on the clock signal to yield a number of digital channels, and a joint equalizer operable to filter the digital channels to yield an equalized output.

20 Claims, 5 Drawing Sheets

(56) References Cited

U.S. PATENT DOCUMENTS

| | | | |
|---|---|---|---|
| 5,341,249 | A | 8/1994 | Abbott et al. |
| 5,377,058 | A | 12/1994 | Good et al. |
| 5,521,948 | A | 5/1996 | Takeuchi |
| 5,523,902 | A | 6/1996 | Pederson |
| 5,594,341 | A | 1/1997 | Majidi-Ahy |
| 5,668,679 | A | 9/1997 | Swearingen et al. |
| 5,696,639 | A | 12/1997 | Spurbeck et al. |
| 5,768,044 | A | 6/1998 | Hetzler |
| 5,781,129 | A | 7/1998 | Schwartz et al. |
| 5,798,885 | A | 8/1998 | Saiki et al. |
| 5,835,295 | A | 11/1998 | Behrens |
| 5,844,920 | A | 12/1998 | Zook et al. |
| 5,852,524 | A | 12/1998 | Glover et al. |
| 5,892,632 | A | 4/1999 | Behrens |
| 5,955,783 | A | 9/1999 | Ben-Efraim |
| 5,970,104 | A | 10/1999 | Zhong et al. |
| 5,986,830 | A | 11/1999 | Hein |
| 5,987,562 | A | 11/1999 | Glover |
| 6,009,549 | A | 12/1999 | Bliss et al. |
| 6,023,383 | A | 2/2000 | Glover et al. |
| 6,069,583 | A | 5/2000 | Silvestrin et al. |
| 6,081,397 | A | 6/2000 | Belser |
| 6,111,712 | A | 8/2000 | Vishakhadatta et al. |
| 6,208,478 | B1 | 3/2001 | Chiu et al. |
| 6,269,058 | B1 | 7/2001 | Yamanoi et al. |
| 6,278,591 | B1 | 8/2001 | Chang |
| 6,400,518 | B1 | 6/2002 | Bhaumik et al. |
| 6,404,829 | B1 | 6/2002 | Sonu |
| 6,411,452 | B1 | 6/2002 | Cloke |
| 6,441,661 | B1 | 8/2002 | Aoki et al. |
| 6,476,989 | B1 | 11/2002 | Chainer |
| 6,490,110 | B2 | 12/2002 | Reed et al. |
| 6,493,162 | B1 | 12/2002 | Fredrickson |
| 6,519,102 | B1 | 2/2003 | Smith et al. |
| 6,530,060 | B1 | 3/2003 | Vis et al. |
| 6,603,622 | B1 | 8/2003 | Christiansen et al. |
| 6,606,048 | B1 | 8/2003 | Sutardja |
| 6,633,447 | B2 | 10/2003 | Franck et al. |
| 6,646,822 | B1 | 11/2003 | Tuttle et al. |
| 6,657,802 | B1 | 12/2003 | Ashley et al. |
| 6,671,404 | B1 | 12/2003 | Kawatani |
| 6,717,764 | B2 | 4/2004 | Lake |
| 6,775,529 | B1 | 8/2004 | Roo |
| 6,788,484 | B2 | 9/2004 | Honma |
| 6,813,108 | B2 | 11/2004 | Annampedu et al. |
| 6,816,328 | B2 | 11/2004 | Rae |
| 6,839,014 | B2 | 1/2005 | Uda |
| 6,856,183 | B2 | 2/2005 | Annampedu |
| 6,865,040 | B2 | 3/2005 | Fayeulle et al. |
| 6,876,511 | B2 | 4/2005 | Koyanagi |
| 6,906,990 | B2 | 6/2005 | Nagata et al. |
| 6,912,099 | B2 | 6/2005 | Annampedu et al. |
| 6,963,521 | B2 | 11/2005 | Hayashi |
| 6,980,382 | B2 | 12/2005 | Hirano et al. |
| 6,999,257 | B2 | 2/2006 | Takeo |
| 6,999,264 | B2 | 2/2006 | Ehrlich |
| 6,999,404 | B2 | 2/2006 | Furumiya et al. |
| 7,002,767 | B2 | 2/2006 | Annampedu et al. |
| 7,016,131 | B2 | 3/2006 | Liu et al. |
| 7,038,875 | B2 | 5/2006 | Lou et al. |
| 7,054,088 | B2 | 5/2006 | Yamazaki et al. |
| 7,072,137 | B2 | 7/2006 | Chiba |
| 7,082,005 | B2 | 7/2006 | Annampedu et al. |
| 7,092,462 | B2 | 8/2006 | Annampedu et al. |
| 7,116,504 | B1 | 10/2006 | Oberg |
| 7,126,776 | B1 | 10/2006 | Warren, Jr. et al. |
| 7,133,227 | B2 | 11/2006 | Chiang |
| 7,136,250 | B1 | 11/2006 | Wu et al. |
| 7,154,689 | B1 | 12/2006 | Shepherd et al. |
| 7,158,464 | B2 | 1/2007 | Gushima et al. |
| 7,167,328 | B2 | 1/2007 | Annampedu et al. |
| 7,180,693 | B2 | 2/2007 | Annampedu et al. |
| 7,187,739 | B2 | 3/2007 | Ma |
| 7,191,382 | B2 | 3/2007 | James et al. |
| 7,193,544 | B1 | 3/2007 | Fitelson et al. |
| 7,193,798 | B2 | 3/2007 | Byrd et al. |
| 7,199,961 | B1 | 4/2007 | Wu et al. |
| 7,203,013 | B1 | 4/2007 | Han et al. |
| 7,203,015 | B2 | 4/2007 | Sakai et al. |
| 7,206,146 | B2 | 4/2007 | Flynn et al. |
| 7,230,789 | B1 | 6/2007 | Brunnett et al. |
| 7,248,425 | B2 | 7/2007 | Byun et al. |
| 7,253,984 | B1 | 8/2007 | Patapoutian et al. |
| 7,265,937 | B1 | 9/2007 | Erden et al. |
| 7,286,313 | B2 | 10/2007 | Erden et al. |
| 7,301,717 | B1 | 11/2007 | Lee et al. |
| 7,308,057 | B1 | 12/2007 | Patapoutian |
| 7,323,916 | B1 | 1/2008 | Sidiropoulos et al. |
| 7,362,536 | B1 | 4/2008 | Liu et al. |
| 7,375,918 | B1 | 5/2008 | Shepherd et al. |
| 7,394,608 | B2 | 7/2008 | Eleftheriou |
| 7,411,531 | B2 | 8/2008 | Aziz et al. |
| 7,420,498 | B2 | 9/2008 | Barrenscheen |
| 7,423,827 | B2 | 9/2008 | Neville |
| 7,446,690 | B2 | 11/2008 | Kao |
| 7,525,460 | B1 | 4/2009 | Liu et al. |
| 7,529,320 | B2 | 5/2009 | Byrne et al. |
| 7,558,177 | B2 | 7/2009 | Ogura et al. |
| 7,602,567 | B2 | 10/2009 | Park |
| 7,602,568 | B1 | 10/2009 | Katchmart |
| 7,616,395 | B2 | 11/2009 | Yamamoto |
| 7,620,101 | B1 | 11/2009 | Jenkins |
| 7,630,155 | B2 | 12/2009 | Maruyama et al. |
| 7,643,235 | B2 | 1/2010 | Erden et al. |
| 7,656,982 | B2 | 2/2010 | Gaedke |
| 7,663,831 | B2 | 2/2010 | Hayashi et al. |
| 7,679,850 | B2 | 3/2010 | Smith |
| 7,693,243 | B2 | 4/2010 | Chen et al. |
| 7,738,200 | B2 | 6/2010 | Annampedu |
| 7,768,437 | B2 | 8/2010 | Annampedu |
| 7,768,730 | B2 | 8/2010 | Bliss et al. |
| 7,796,480 | B2 | 9/2010 | Cheng et al. |
| 7,813,065 | B2 | 10/2010 | Annampedu |
| 7,821,730 | B2 | 10/2010 | Cao |
| 7,835,104 | B2 | 11/2010 | Yamashita |
| 7,889,823 | B2 | 2/2011 | Yang |
| 7,929,237 | B2 | 4/2011 | Grundvig |
| 8,014,099 | B2 | 9/2011 | Mathew |
| 8,054,573 | B2 | 11/2011 | Mathew |
| 8,054,931 | B2 | 11/2011 | Annampedu |
| 8,059,349 | B2 | 11/2011 | Annampedu |
| 8,098,451 | B2 | 1/2012 | Graef |
| 8,102,960 | B2 | 1/2012 | Ran et al. |
| 8,107,573 | B2 | 1/2012 | Chang |
| 8,154,818 | B2 | 4/2012 | Mathew |
| 8,154,972 | B2 | 4/2012 | Ratnakar Aravind |
| 8,169,726 | B2 | 5/2012 | Wilson |
| 8,174,784 | B2 | 5/2012 | Grundvig |
| 8,174,949 | B2 | 5/2012 | Ratnakar Aravind |
| 8,237,597 | B2 | 8/2012 | Liu |
| 8,243,381 | B2 | 8/2012 | Annampedu |
| 8,254,049 | B2 | 8/2012 | Annampedu |
| 8,261,171 | B2 | 9/2012 | Annampedu |
| 2002/0150179 | A1 | 10/2002 | Leis et al. |
| 2005/0243455 | A1 | 11/2005 | Annampedu |
| 2007/0104300 | A1 | 5/2007 | Esumi et al. |
| 2008/0056403 | A1 | 3/2008 | Wilson |
| 2008/0069199 | A1* | 3/2008 | Chen et al. ............ 375/233 |
| 2009/0142620 | A1 | 6/2009 | Yamamoto et al. |
| 2009/0274247 | A1 | 11/2009 | Galbraith et al. |
| 2010/0061490 | A1 | 3/2010 | Noeldner |
| 2010/0067628 | A1 | 3/2010 | Buehner |
| 2010/0142078 | A1 | 6/2010 | Annampedu |
| 2011/0043938 | A1 | 2/2011 | Mathew |
| 2011/0157737 | A1 | 6/2011 | Grundvig |
| 2011/0209026 | A1 | 8/2011 | Xia |
| 2012/0036173 | A1 | 2/2012 | Annampedu |
| 2012/0084336 | A1 | 4/2012 | Yang |
| 2012/0087035 | A1 | 4/2012 | Graef |
| 2012/0106607 | A1 | 5/2012 | Miladinovic |
| 2012/0120784 | A1 | 5/2012 | Yang |
| 2012/0124241 | A1 | 5/2012 | Yang |
| 2012/0134042 | A1 | 5/2012 | Annampedu |
| 2012/0134043 | A1 | 5/2012 | Annampedu |

(56) References Cited

U.S. PATENT DOCUMENTS

| | | |
|---|---|---|
| 2012/0155587 A1 | 6/2012 | Annampedu |
| 2012/0182643 A1 | 7/2012 | Zhang |
| 2012/0236428 A1 | 9/2012 | Xia |
| 2013/0286502 A1 | 10/2013 | Erden et al. |

OTHER PUBLICATIONS

Annampedu, V. et al "Adaptive Algorithms for Asynchronous Detection of Coded Servo Signals Based on Interpolation", IEEE Transactions on Magnetics, vol. 41, No. 10, Oct. 2005.

Aziz et al., "Asynchronous Maximum Likelihood (ML) Detection of Servo Repeatable Run Out (RRO) Data", Digest, IEEE Intl Mag Conf, vol. 42, No. 10, pp. 2585-2587 (Oct. 2006).

Aziz et al., "Interpolation Based Maximum-Likelihood(ML) Detection of Asynchronous Servo Repeatable Run Out (RRO) Data" IEEE Intl Mag Conf. vol. 42 No. 10 pp. 2585-2587, Oct. 2006.

Hagenauer et al., "A Viterbi algorithm with soft-decision outputs and its applications," in Proc. IEEE Global Telecom Conf 1989, Dallas, Texas, pp. 1680-1686 (Nov. 1989).

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

U.S. Appl. No. 13/173,088, Unpublished (filed Jun. 30, 2011) (Jeffrey P. Grundvig).

U.S. Appl. No. 13/096,873, Unpublished (filed Apr. 28, 2011) (Ross S. Wilson).

U.S. Appl. No. 14/021,811, Unpublished (filed Sep. 9, 2013) (George Mathew).

U.S. Appl. No. 13/186,267, Unpublished (filed Jul. 19, 2011) (Haitao Xia).

U.S. Appl. No. 13/242,983, Unpublished (filed Sep. 23, 2011) (Jeffrey P. Grundvig).

U.S. Appl. No. 13/490,913, Unpublished (filed Jun. 7, 2012) (Xun Zhang).

U.S. Appl. No. 13/491,135, Unpublished (filed Jun. 7, 2012) (Xun Zhang).

U.S. Appl. No. 13/777,937, Unpublished (filed Feb. 26, 2013) (Rui Cao).

U.S. Appl. No. 13/941,464, Unpublished (filed Jul. 13, 2013) (Bruce A. Wilson).

U.S. Appl. No. 13/952,415, Unpublished (filed Jul. 26, 2013) (Shaohua Yang).

U.S. Appl. No. 13/100,021, Unpublished (filed May 3, 2011) (Haitao Xia).

Weller et al "Thermal Limits in Ultrahigh-density Magnetic Recording" IEEE Trans. Magn. vol. 35, No. 6, p. 4423, Nov. 1999.

* cited by examiner

ARRAY-READER BASED MAGNETIC RECORDING SYSTEMS WITH MIXED SYNCHRONIZATION

CROSS REFERENCE TO RELATED APPLICATIONS

The present application claims priority to (is a non-provisional of) U.S. Pat. App. No. 61/875,013, entitled "Array-Reader Based Magnetic Recording Systems With Mixed Synchronization", and filed Sep. 7, 2013 by Mathew et al, the entirety of which is incorporated herein by reference for all purposes.

FIELD OF THE INVENTION

Various embodiments of the present invention provide systems and methods for processing data, and more particularly to systems and methods for equalization and timing of signals from an array-reader in a magnetic recording system.

BACKGROUND

In a typical magnetic storage system, digital data is stored in a series of concentric circular tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

BRIEF SUMMARY

Some embodiments of the present invention provide a magnetic recording system including an array of analog inputs operable to receive an array of analog signals retrieved from a magnetic storage medium, where one of the array of analog signals corresponds with a reference channel, a timing recovery circuit operable to generate a clock signal based on the analog signal for the reference channel, a number of analog to digital converters each operable to sample one of the array of analog signals based on the clock signal to yield a number of digital channels, and a joint equalizer operable to filter the digital channels to yield an equalized output.

This summary provides only a general outline of some embodiments according to the present invention. Many other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Embodiments of the present invention are related to systems and methods for equalization and timing of signals from an array-reader in a magnetic recording system. In an array-reader, an array of read heads are provided, yielding multiple data streams for a single data track. The multiple data streams can be used in some embodiments to improve noise compensation, for example reducing inter-track interference by reading a data track at a number of offsets from the track center, or to increase throughput by reading data bits from multiple tracks. In some embodiments, the array-reader simultaneously reads a particular data track with multiple read heads at different locations.

In the array-reader based magnetic recording system, data recorded on a particular track is recovered by applying a data detection algorithm on a jointly equalized version of the outputs of the array-reader. The data from the array-reader is processed first by a preamplifier connected to the read/write head, then by a read channel including circuits such as, but not limited to, analog front end, analog to digital converter, joint equalizer, and data detector circuits. Each channel of the array-reader output is processed by a separate analog front-end circuit in the read channel, performing functions such as, but not limited to, amplification, biasing, and filtering. The data is then recovered by applying the data detection algorithm to the jointly equalized version of the outputs of the array-reader, where the joint equalizer is a multi-input single output filter or multi-input multi-output filter.

The signal in each channel of the array-reader output can experience different phase and/or frequency shifts. However, providing a digital phase locked loop for each channel to individually time-synchronize each channel prior to joint equalization is costly in area and power perspectives. In the array-reader based magnetic recording systems with mixed synchronization disclosed herein, some channels are processed without digital phase locked loops, relying on the joint equalizer to compensate the residual timing errors. In some embodiments, a digital phase locked loop is provided to synchronize a reference channel, and other channels are synchronized to the reference channel rather than individually. In some embodiments, interpolating timing recovery circuits are provided to correct residual timing errors in the channels without digital phase locked loops.

Figure 1:
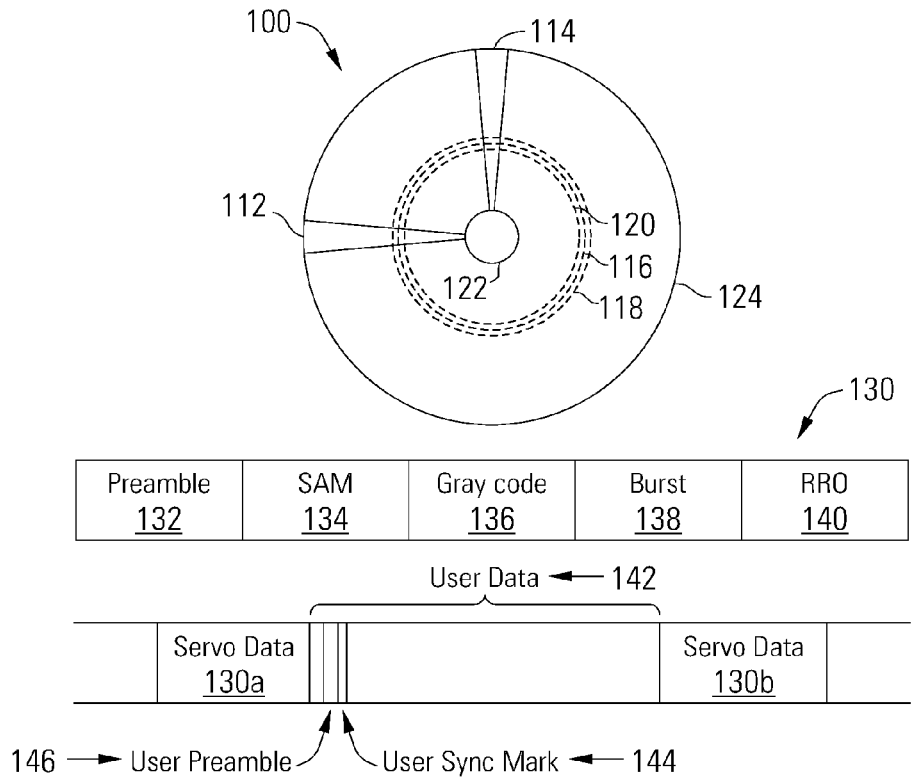
FIG. 1 is a diagram of a magnetic storage medium and sector data scheme which can be used with an array-reader in accordance with some embodiments of the present invention.

Turning to FIG. 1, a magnetic storage medium 100 is depicted with which an array-reader based magnetic recording system with mixed synchronization can be used in accordance with some embodiments of the present invention. Example array-reader paths 116, 118, 120 over a data track are shown, indicated as dashed lines. (A data track under array-reader paths 116, 118, 120 is not explicitly shown.) Data tracks are segregated by servo data written within servo wedges 112, 114, enabling a read/write head assembly with array-reader to be positioned over the disk platter 124. It should be noted that hundreds of servo wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132, used to derive bootstrap phase information for timing and gain recovery, followed by a servo address mark 134, followed by a Gray code field 136, a burst field 138, and a repeatable run-out (RRO) field 140. It should be noted that a servo data set may have two or more fields of burst information. Further, it should be noted that different information may be included in the servo fields. Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin. The servo data 130 in servo wedges 112, 114 enables the read/write head assembly to be positioned correctly over the disk platter 124 to write or read a particular data sector. The preamble pattern 132 also provides a sinusoidal input pattern from which the phase of the retrieved servo data can be initially determined for timing recovery to adjust a frequency synthesizer used to control the sampling of the servo data.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146. The preamble pattern 146 also provides a sinusoidal input pattern from which the phase of the retrieved user data can be initially determined for timing recovery to adjust a frequency synthesizer used to control the sampling of the user data.

Figure 2:
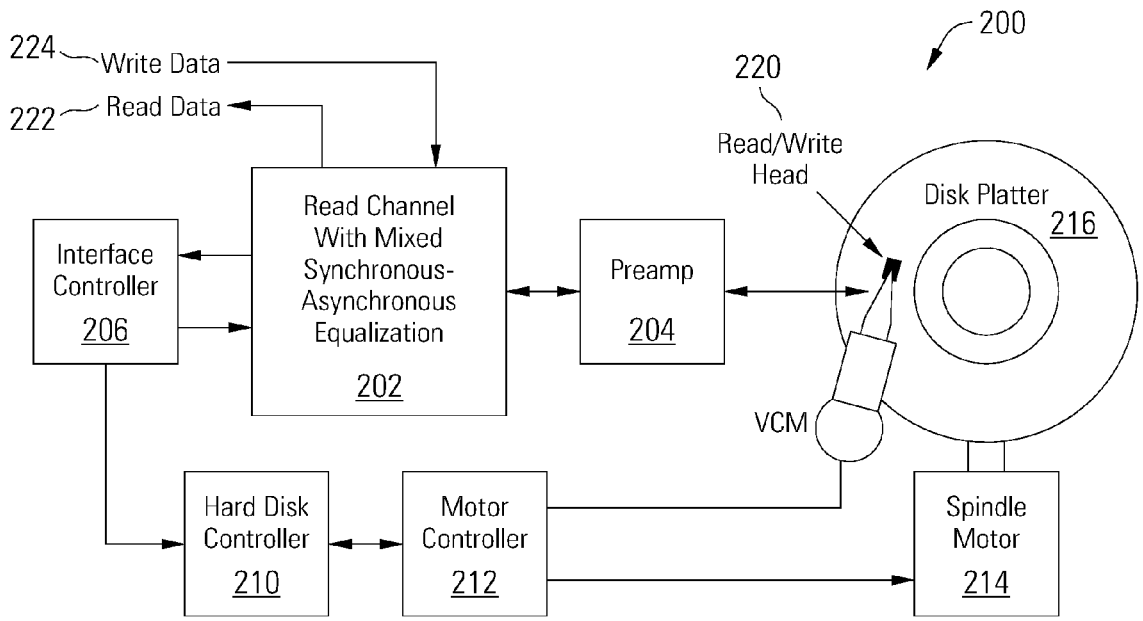
FIG. 2 depicts a storage system including a read channel with mixed synchronous-asynchronous equalization in accordance with some embodiments of the present invention.

Turning to FIG. 2, a storage system 200 is illustrated as an example application of an array-reader based magnetic recording system with mixed synchronization in accordance with some embodiments of the present invention. The storage system 200 includes a read channel circuit 202 with mixed synchronous/asynchronous equalization. Storage system 200 may be, for example, a hard disk drive. Storage system 200 also includes a preamplifier 204 operable to amplify signals from an array-reader, an interface controller 206, a hard disk controller 210, a motor controller 212, a spindle motor 214, a disk platter 216, and a read/write head assembly 220 with array-reader. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by an array-reader in read/write head assembly 220 as disk platter 216 is rotated by spindle motor 214. The sensed magnetic signals are provided as continuous, minute analog signals representative of the magnetic data on disk platter 216. These minute analog signals are transferred from read/write head assembly 220 to read channel circuit 202 via preamplifier 204. Preamplifier 204 is operable to amplify the minute analog signals accessed from disk platter 216. In turn, read channel circuit 202 digitizes the received analog signals and jointly equalizes them with mixed synchronous/asynchronous equalization, then decodes the resulting data to recreate the information originally written to disk platter 216. This data is provided as read data 222 to a receiving circuit. A write operation is substantially the opposite of the preceding read operation with write data 224 being provided to read channel circuit 202. The mixed synchronous/asynchronous equalization can be implemented consistent with that disclosed below in relation to FIGS. 3-5. In some embodiments, the multi-level encoding and decoding is performed consistent with the flow diagrams disclosed below in relation to FIGS. 6-7.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 200 can be modified to include solid state memory that is used to store data in addition to the storage offered by disk platter 216. This solid state memory can be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
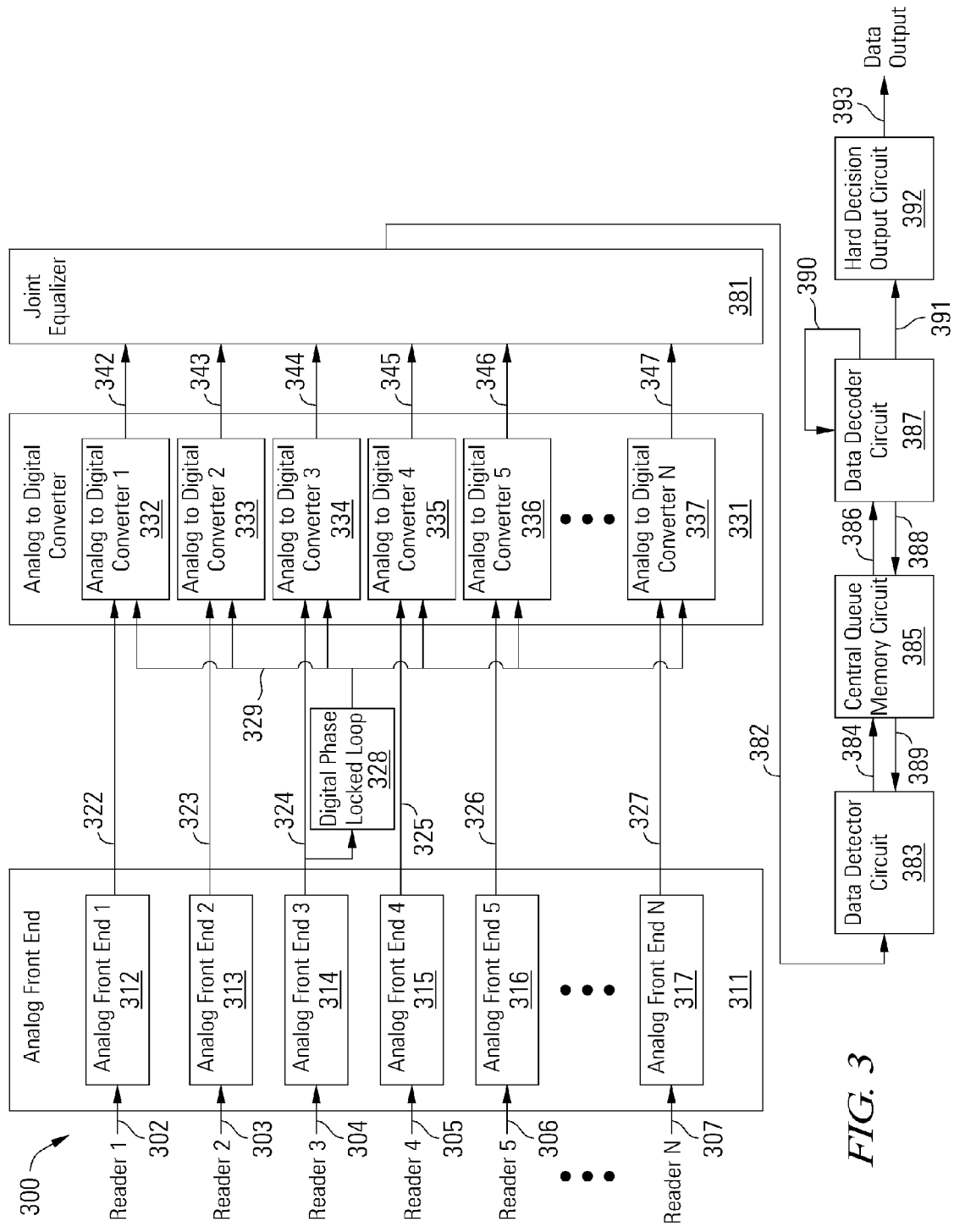
FIG. 3 depicts an array-reader based system with mixed synchronous-asynchronous equalization with a synchronous reference channel and asynchronous non-reference channels in accordance with some embodiments of the present invention.

Turning to FIG. 3, an array-reader based system 300 with mixed synchronous-asynchronous equalization is depicted in accordance with some embodiments of the present invention. The array-reader based system 300 has a number N of analog inputs 302, 303, 304, 305, 306, 307 from an array-reader, where N is any number greater than 1. One of the analog inputs (e.g., 304) is selected to correspond to a reference data channel, and the others correspond to non-reference data channels. In some embodiments, the reference channel corresponds with the array-reader element positioned nearest the center of a data track on a magnetic storage medium. The array-reader based system 300 samples the reference channel synchronously, using timing information derived by a digital phase locked loop 328 or other timing circuit based on the reference channel 304. The timing information derived for the reference channel is also applied to the remaining channels. The channels other than the reference channel are thus sampled using timing information derived based on the reference channel. The remaining channels can thus be said to be asynchronously sampled, although they are sampled based on a clock signal, because that clock signal is not based on the remaining channels. The non-reference channel sampling is asynchronous in the sense that relative timing variations present in these channels with respect to the reference channel remain as residual timing errors after clocking with the clock signal 329 generated for the reference channel.

The analog inputs 302-307 are processed in an analog front end circuit 311, with individual analog front ends 312, 313, 314, 315, 316, 317 for each of the analog inputs 302-307. The analog front ends 312-317 perform functions such as, but not limited to, amplification, biasing, and filtering of the analog inputs 302-307, yielding processed analog signals 322, 323, 324, 325, 326, 327. The analog front ends 312-317 can be any circuit known in the art for processing an analog signal prior to sampling and further processing such as equalization and value detection. Based upon the disclosure provided herein, one of ordinary skill in the art will recognize a variety of analog front end circuits that may be used in relation to different embodiments of the present invention.

A timing recovery circuit or digital phase locked loop 328 performs timing recovery based on the processed analog signal 324 for the reference channel, generating a clock signal 329. The digital phase locked loop 328 determines the frequency and/or phase of the processed analog signal 324 for the reference channel, using any suitable circuit. In some embodiments, the digital phase locked loop 328 includes a frequency synthesizer to generate the clock signal 329, and a timing error detector to determine the frequency and/or phase of the processed analog signal 324. The digital phase locked loop 328 operates in some embodiments in an acquisition mode, deriving phase information when a repeating quasi-sinusoidal preamble pattern or other known pattern is received in processed analog signal 324. Based upon the disclosure provided herein, one of ordinary skill in the art will recognize a variety of timing recovery circuits that may be used in relation to different embodiments of the present invention to generate a clock signal 329 based on the processed analog signal 324 for the reference channel.

The processed analog signals 322-327 are sampled or digitized by analog to digital converter circuit 331, which in some embodiments includes separate analog to digital converters 332, 333, 334, 335, 336, 337 for each of the processed analog signals 322-327. Sampling of the processed analog signals 322-327 in each analog to digital converter 332-337 is controlled by the clock signal 329, which is synchronized to the reference channel. Analog to digital converters 332-337 yield digital outputs or digital channels 342, 343, 344, 345, 346, 347. Analog to digital converters 332-337 can be any circuits known in the art that are capable of producing digital samples corresponding to an analog input signal. Based upon the disclosure provided herein, one of ordinary skill in the art will recognize a variety of analog to digital converter circuits that may be used in relation to different embodiments of the present invention.

The N digital channels 342-347 are provided to a joint equalizer 381, which equalizes or filters the N digital channels 342-347. In some embodiments, the joint equalizer 381 applies digital finite impulse response filtering to the N digital channels 342-347 to yield equalized data samples 382 for the data track based on the N digital channels 342-347. The joint equalizer 381 thus increases the signal to noise ratio for the data track based on the information in the multiple channels from the array-reader. In some embodiments, the joint equalizer 381 performs adaptive equalization, giving the joint equalizer 381 the ability to respond to residual timing errors in the input signals of the non-reference channels. The joint equalizer 481 acts to shape the signal to a partial response target while reducing noise and residual timing errors. Although the non-reference channels are sampled asynchronously and can have individual phase offsets as a result, the joint equalizer 381 is operable to account for constant phase shifts. Based upon the disclosure provided herein, one of ordinary skill in the art will recognize a variety of equalizer circuits that may be used in relation to different embodiments of the present invention. The equalized data samples 382 may be subsequently processed in any suitable manner, such as in a detector and/or decoder to identify the values in the equalized data samples 382.

In some embodiments, the equalized data samples 382 are provided to a data detector circuit 383 which produces a detected output 384 by applying a data detection algorithm to the data input. In some embodiments, the data detection algorithm can be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention.

Detected output 384 is provided to a central queue memory circuit 385 that operates to buffer data passed between data detector circuit 383 and data decoder circuit 387. When data decoder circuit 387 is available, data decoder circuit 387 receives detected output 384 from central queue memory 385 as a decoder input 386. Data decoder circuit 387 applies a data decoding algorithm to decoder input 386 in an attempt to recover originally written data. The result of the data decoding algorithm is provided as a decoded output 391. Data decoder circuit 387 can be any data decoder circuit known in the art that is capable of applying a decoding algorithm to a received input. Data decoder circuit 387 can be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 387 provides the result of the data decoding algorithm as a decoded output 391. Decoded output 391 is provided to a hard decision output circuit 392 where the data is reordered before providing a series of ordered data sets as a data output 393.

One or more iterations through the combination of data detector circuit 383 and data decoder circuit 387 can be made in an effort to converge on the originally written data set. Processing through both the data detector circuit 383 and data decoder circuit 387 is referred to as a "global iteration". For the first global iteration, data detector circuit 383 applies the data detection algorithm without guidance from a decoded output. For subsequent global iterations, data detector circuit 383 applies the data detection algorithm to equalized data samples 382 as guided by decoded output 388. Decoded output 388 is received from central queue memory 385 as a detector input 389.

During each global iteration it is possible for data decoder circuit 387 to make one or more local iterations including application of the data decoding algorithm to decoder input 386. For the first local iteration, data decoder circuit 387 applies the data decoder algorithm without guidance from a decoded output 390. For subsequent local iterations, data decoder circuit 387 applies the data decoding algorithm to decoder input 386 as guided by a previous decoded output 390.

Figure 4:
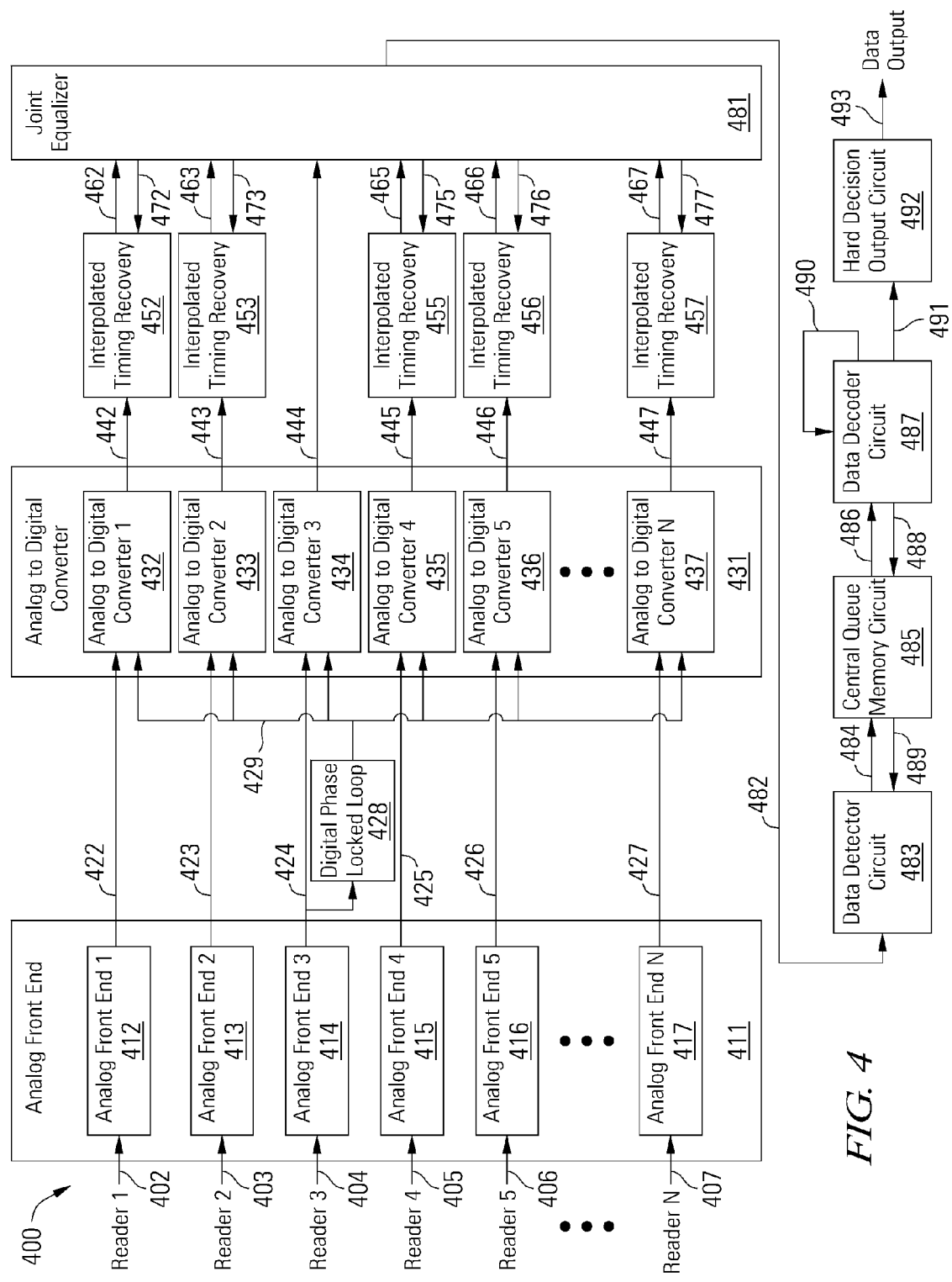
FIG. 4 depicts an array-reader based system with mixed synchronous-asynchronous equalization with a synchronous reference channel and with interpolated timing recovery of non-reference channels in accordance with some embodiments of the present invention.

Turning to FIG. 4, an array-reader based system 400 with mixed synchronous-asynchronous equalization and interpolated timing recovery is depicted in accordance with some embodiments of the present invention. In the embodiment of FIG. 4, the array-reader based system 400 includes interpolated timing recovery circuits 452, 453, 455, 456, 457 for non-reference channels to correct for phase changes due to frequency changes between channels. The array-reader based system 400 has a number N of analog inputs 402, 403, 404, 405, 406, 407 from an array-reader, where N is any number greater than 1. One of the analog inputs (e.g., 404) is selected as a reference channel. In some embodiments, the reference channel corresponds with the array-reader element positioned nearest the center of a data track on a magnetic storage medium. The array-reader based system 400 samples the reference channel synchronously, using timing information derived by a digital phase locked loop 428 or other timing circuit based on the reference channel 404. The timing information derived for the reference channel is also applied to the remaining channels. The channels other than the reference channel are thus sampled using timing information derived based on the reference channel. The remaining channels can thus be said to be asynchronously sampled, although they are sampled based on a clock signal, because that clock signal is not based on the remaining channels.

The analog inputs 402-407 are processed in an analog front end circuit 411, with individual analog front ends 412, 413, 414, 415, 416, 417 for each of the analog inputs 402-407. The analog front ends 412-417 perform functions such as, but not limited to, amplification, biasing, and filtering of the analog inputs 402-407, yielding processed analog signals 422, 423, 424, 425, 426, 427. The analog front ends 412-417 can be any circuit known in the art for processing an analog signal prior to sampling and further processing such as equalization and value detection. Based upon the disclosure provided herein, one of ordinary skill in the art will recognize a variety of analog front end circuits that may be used in relation to different embodiments of the present invention. The non-reference channel sampling is asynchronous in the sense that relative timing variations present in these channels with respect to the reference channel remain as residual timing errors after clocking with the clock signal 329 generated for the reference channel.

A digital phase locked loop 428 performs timing recovery based on the processed analog signal 424 for the reference channel, generating a clock signal 429. The digital phase locked loop 428 determines the frequency and/or phase of the processed analog signal 424 for the reference channel, using any suitable circuit. In some embodiments, the digital phase locked loop 428 includes a frequency synthesizer to generate the clock signal 429, and a timing error detector to determine the frequency and/or phase of the processed analog signal 424. The digital phase locked loop 428 operates in some embodiments in an acquisition mode, deriving phase information when a repeating quasi-sinusoidal preamble pattern or other known pattern is received in processed analog signal 424. Based upon the disclosure provided herein, one of ordinary skill in the art will recognize a variety of digital phase locked loop circuits that may be used in relation to different embodiments of the present invention to generate a clock signal 429 based on the processed analog signal 424 for the reference channel.

The processed analog signals 422-427 are sampled by analog to digital converter circuit 431, which in some embodiments includes separate analog to digital converters 432, 433, 434, 435, 436, 437 for each of the processed analog signals 422-427. Sampling of the processed analog signals 422-427 in each analog to digital converter 432-437 is controlled by the clock signal 429, which is synchronized to the reference channel. Analog to digital converters 432-437 yield digital channels 442, 443, 444, 445, 446, 447. Analog to digital converters 432-437 can be any circuits known in the art that are capable of producing digital samples corresponding to an analog input signal. Based upon the disclosure provided herein, one of ordinary skill in the art will recognize a variety of analog to digital converter circuits that may be used in relation to different embodiments of the present invention.

The N-1 non-reference digital channels 442, 443, 445, 446, 447 are provided to interpolated timing recovery circuits 452, 453, 455, 456, 457 which interpolate between samples to correct for residual timing errors that might remain after clocking the analog to digital converters 432, 433, 435, 436, 437 with the clock signal 429. In some embodiments, the interpolated timing recovery circuits 452-457 are first order interpolated timing recovery circuits to compensate for phase offsets. In other embodiments, the interpolated timing recovery circuits 452-457 are more complex circuits such as second order interpolated timing recovery circuits to compensate for phase and frequency offsets. In some embodiments, to facilitate accurate timing recovery in interpolated timing recovery circuits 452-457, the analog signals 422-427 are sampled by the analog to digital converters 432-437 at a sampling rate that is slightly larger than the baud-rate of the data-bits recorded on the medium 124. Based upon the disclosure provided herein, one of ordinary skill in the art will recognize a variety of over-sampling rates that may be used in relation to different embodiments of the present invention. The interpolated timing recovery circuits 452, 453, 455, 456, 457 yield interpolated digital channels 462, 463, 465, 466, 467 based on non-reference digital channels 442, 443, 445, 446, 447. The interpolated timing recovery circuits 452, 453, 455, 456, 457 use digital channels 442, 443, 445, 446, 447 and feedback signals 472, 473, 475, 476, 477 from the joint equalizer to determine the different phases to be used for interpolating digital channels 442, 443, 445, 446, 447 in the interpolated timing recovery circuits 452, 453, 455, 456, 457.

The reference digital channel 444 and interpolated digital channels 462, 463, 465, 466, 467 are provided to a joint equalizer 481, which equalizes or filters the multiple inputs to yield a single output of equalized data samples 482. In some embodiments, the joint equalizer 481 applies digital finite impulse response filtering to the reference digital channel 444 and interpolated digital channels 462, 463, 465, 466, 467 to yield equalized data samples 482 for the data track based on the reference digital channel 444 and interpolated digital channels 462, 463, 465, 466, 467. The joint equalizer 481 thus increases the signal to noise ratio for the data track based on the information in the multiple channels from the array-reader. The joint equalizer 481 acts to shape the signal to a partial response target while reducing noise and residual timing errors. In some embodiments, the joint equalizer 481 performs adaptive equalization, giving the joint equalizer 481 the ability to respond to residual timing errors in the input signals of the non-reference channels. Based upon the disclosure provided herein, one of ordinary skill in the art will recognize a variety of equalizer circuits that may be used in relation to different embodiments of the present invention. The equalized data samples 482 may be subsequently processed in any suitable manner, such as in a detector and/or decoder to identify the values in the equalized data samples 482.

In some embodiments, the equalized data samples 482 are provided to a data detector circuit 483 which produces a detected output 484 by applying a data detection algorithm to the data input. In some embodiments, the data detection algorithm can be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention.

Detected output 484 is provided to a central queue memory circuit 485 that operates to buffer data passed between data detector circuit 483 and data decoder circuit 487. When data decoder circuit 487 is available, data decoder circuit 487 receives detected output 484 from central queue memory 485 as a decoder input 486. Data decoder circuit 487 applies a data decoding algorithm to decoder input 486 in an attempt to recover originally written data. The result of the data decoding algorithm is provided as a decoded output 491. Data decoder circuit 487 can be any data decoder circuit known in the art that is capable of applying a decoding algorithm to a received input. Data decoder circuit 487 can be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 487 provides the result of the data decoding algorithm as a decoded output 491. Decoded output 491 is provided to a hard decision output circuit 492 where the data is reordered before providing a series of ordered data sets as a data output 493.

One or more iterations through the combination of data detector circuit 483 and data decoder circuit 487 can be made in an effort to converge on the originally written data set. Processing through both the data detector circuit 483 and data decoder circuit 487 is referred to as a "global iteration". For the first global iteration, data detector circuit 483 applies the data detection algorithm without guidance from a decoded output. For subsequent global iterations, data detector circuit 483 applies the data detection algorithm to equalized data samples 482 as guided by decoded output 488. Decoded output 488 is received from central queue memory 485 as a detector input 489.

During each global iteration it is possible for data decoder circuit 487 to make one or more local iterations including application of the data decoding algorithm to decoder input 486. For the first local iteration, data decoder circuit 487 applies the data decoder algorithm without guidance from a decoded output 490. For subsequent local iterations, data decoder circuit 487 applies the data decoding algorithm to decoder input 486 as guided by a previous decoded output 490.

Figure 5:
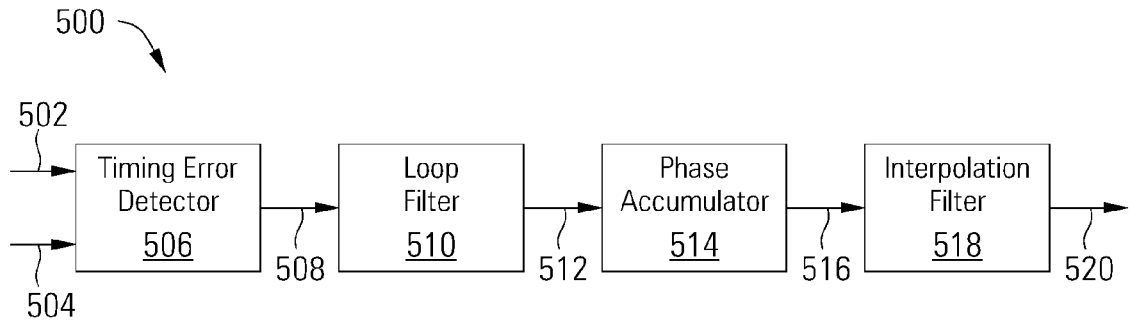
FIG. 5 depicts an interpolated timing recovery circuit in accordance with some embodiments of the present invention.

Turning to FIG. 5, an interpolated timing recovery circuit 500 is depicted that can be used in place of interpolated timing recovery circuits 452, 453, 455, 456, 457 in accordance with some embodiments of the present invention. A timing error detector 506 uses input data samples 502 from one of the non-reference digital channels 442, 443, 445, 446, 447 and a target 504 to yield a timing error signal 508. In some embodiments, the target 504 is provided as the ideal samples of equalizer output without timing errors. In other embodiments, the target 504 can be the joint equalizer output 482, or difference between actual output 482 of joint equalizer and ideal output of joint equalizer. Based upon the disclosure provided herein, one of ordinary skill in the art will recognize a variety of target outputs that may be used in relation to different embodiments of the present invention. The timing error signal 508 is filtered in a loop filter 510 that helps to suppress or minimize the noise in the derived timing error information, yielding filtered timing error signal 512. In some embodiments, the loop filter 510 is chosen to be of second order type to account for frequency offset in the timing error signal 508. The filtered timing error signal 512 is passed through a phase accumulator 514 that integrates the loop filter output 512 to generate information about the phase error 516 in data samples 502. An interpolation filter 518 interpolates between the data samples 502 based on the phase error 516, yielding interpolated data samples 520 with the phase error cancelled. Based upon the disclosure provided herein, one of ordinary skill in the art will recognize a variety of approaches for performing interpolation that may be used in relation to different embodiments of the present invention.

Figure 6:
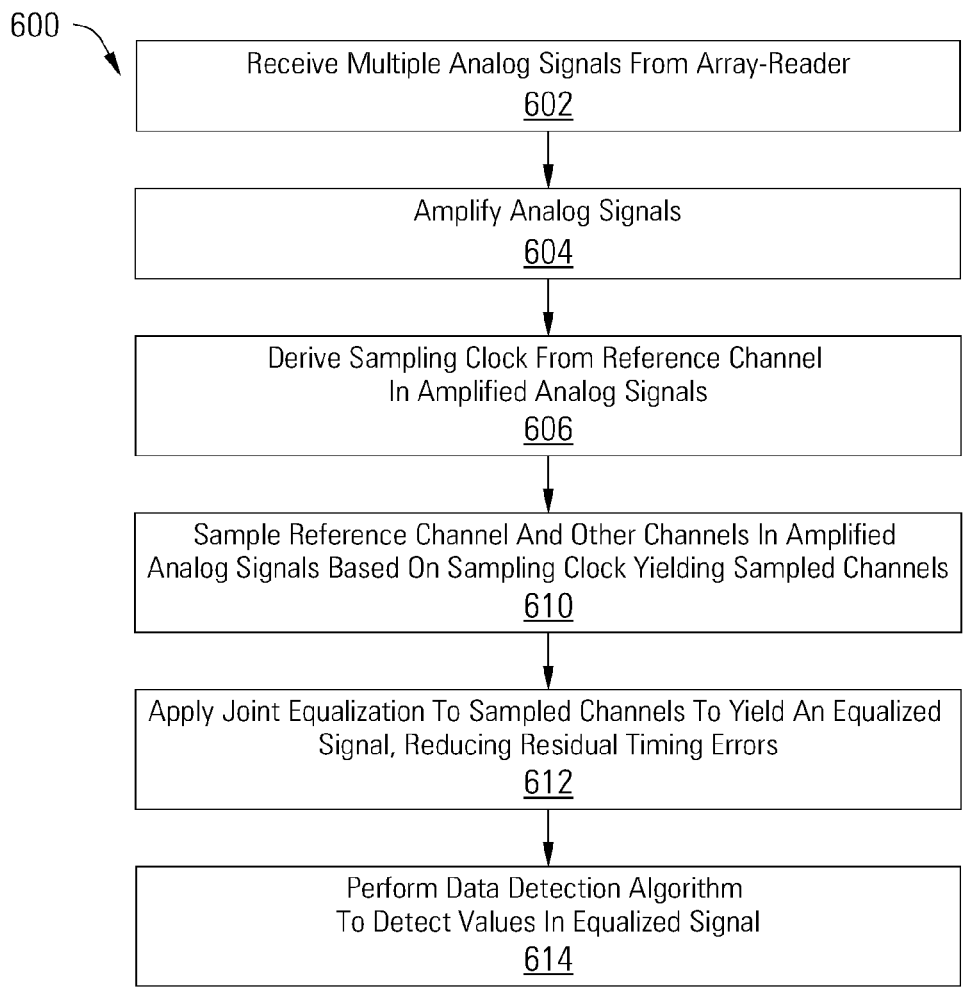
FIG. 6 depicts a flow diagram of an operation to process data with mixed synchronous-asynchronous equalization based on a synchronous reference channel and asynchronous non-reference channels in accordance with some embodiments of the present invention.

Turning to FIG. 6, a flow diagram 600 depicts an operation to process data with mixed synchronous-asynchronous equalization based on a synchronous reference channel and asynchronous non-reference channels in accordance with some embodiments of the present invention. Following flow diagram 600, multiple analog signals are received from an array-reader (block 602). The analog signals are amplified (block 604), and a sampling clock is derived from a reference channel in the amplified analog signals (block 606). In some embodiments, the reference channel is the channel obtained from the array-reader element closest to the center of a data track being read. The reference channel and non-reference channels are sampled based on the sampling clock, yielding sampled channels (block 610). The sampling of the non-reference channels is asynchronous in the sense that relative timing variations present in these channels with respect to the reference channel remain as residual timing errors after sampling with the sampling clock derived from the reference channel. The sampled channels are jointly equalized to yield an equalized signal (block 612). The joint equalization acts to shape the equalized signal to a partial response target while reducing noise and residual timing errors. A data detection algorithm is performed to detect values in the equalized signal (block 614). The detected values can then be processed further or output.

Figure 7:
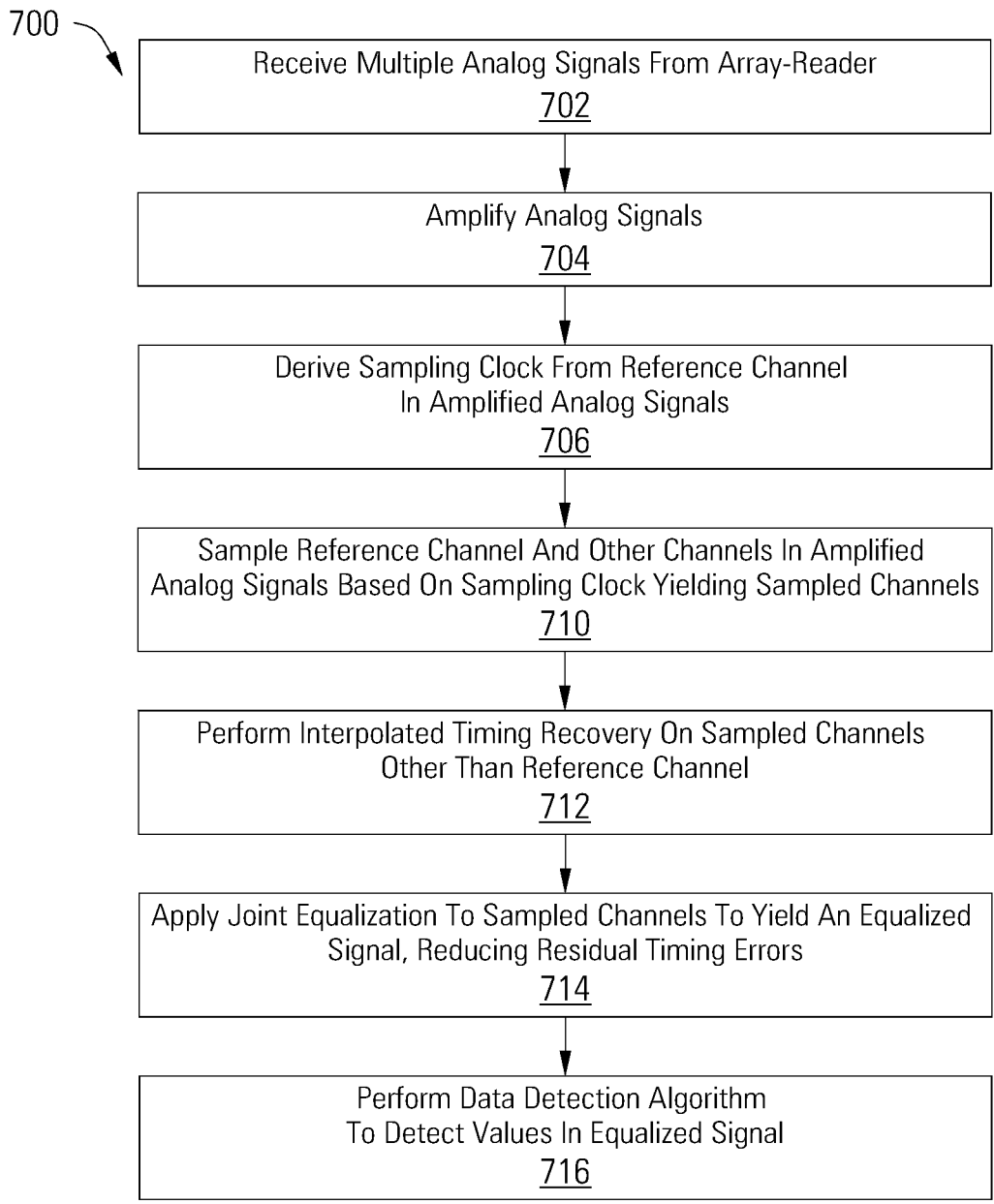
FIG. 7 depicts a flow diagram of an operation to process data with mixed synchronous-asynchronous equalization using a synchronous reference channel and interpolated timing recovery for non-reference channels in accordance with some embodiments of the present invention.

Turning to FIG. 7, a flow diagram 700 depicts an operation to process data with mixed synchronous-asynchronous equalization using a synchronous reference channel and interpolated timing recovery for non-reference channels in accordance with some embodiments of the present invention. Following flow diagram 700, multiple analog signals are received from an array-reader (block 702). The analog signals are amplified (block 704), and a sampling clock is derived from a reference channel in the amplified analog signals (block 706). In some embodiments, the reference channel is the channel obtained from the array-reader element closest to the center of a data track being read. The reference channel and non-reference channels are sampled based on the sampling clock, yielding sampled channels (block 710). The sampling of the non-reference channels is asynchronous in the sense that relative timing variations present in these channels with respect to the reference channel remain as residual timing errors after sampling with the sampling clock derived from the reference channel. Interpolated timing recovery is performed on the non-reference channels (block 712). In some embodiments, the interpolated timing recovery includes calculating a timing error for each of the non-reference channels based on non-reference channel samples, equalizer output and ideal target values of the equalizer, and interpolating between samples in each of the non-reference channels to yield non-reference channels in which the timing errors have been cancelled. The sampled channels are jointly equalized to yield an equalized signal (block 714). The joint equalization is performed on the reference channel samples and on the interpolated non-reference channel samples. The joint equalization acts to shape the equalized signal to a partial response target while reducing noise and residual timing errors. A data detection algorithm is performed to detect values in the equalized signal (block 716). The detected values can then be processed further or output.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for an array-reader based magnetic recording system with mixed synchronous/asynchronous equalization. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. A magnetic recording system comprising:
    an array-reader head assembly disposed in relation to a magnetic storage medium and operable to provide an array of analog signals corresponding to information on the storage medium, one of the array of analog signals corresponding with a reference channel;
    a timing recovery circuit operable to generate a clock signal based on the analog signal for the reference channel;
    a plurality of analog to digital converters each operable to sample one of the array of analog signals based on the clock signal to yield a plurality of digital channels; and
    a joint equalizer operable to filter the plurality of digital channels to yield an equalized output, the joint equalizer comprising a multi-input single-output filter.

2. The system of claim 1, wherein the joint equalizer is operable to account for constant phase shifts in the plurality of digital channels.

3. The system of claim 1, wherein the joint equalizer is operable to shape the equalized output based at least in part on a partial response target.

4. The system of claim 1, further comprising a plurality of analog front end circuits operable to amplify each of the analog signals prior to sampling.

5. The system of claim 4, wherein the timing recovery circuit is operable to generate the clock signal based on the analog signal for the reference channel after being amplified in one of the analog front end circuits.

6. The system of claim 1, wherein the timing recovery circuit comprises a digital phase locked loop.

7. The system of claim 1, further comprising at least one interpolated timing recovery circuit operable to interpolate between samples in a corresponding one of the plurality of digital channels to reduce phase errors.

8. The system of claim 1, further comprising an interpolated timing recovery circuit for each of the non-reference digital channels, operable to calculate a timing error for each of the non-reference digital channels and to generate interpolated digital channels in which the timing errors are reduced.

9. The system of claim 8, wherein the joint equalizer is operable to filter the reference digital channel and non-reference interpolated digital channels to yield the equalized output.

10. The system of claim 8, further comprising equalizer outputs from the joint equalizer provided to each of the interpolated timing recovery circuits, wherein the interpolated timing recovery circuits calculate the timing errors based at least in part on the equalizer outputs.

11. The system of claim 10, wherein the equalizer outputs comprise target signals each adapted to their corresponding non-reference digital channels.

12. The system of claim 8, wherein the interpolated timing recovery circuits comprise a timing error detector operable to generate a timing error signal based at least in part on target signals from the joint equalizer, and an interpolation filter operable to interpolate between the samples according to the timing error signal.

13. The system of claim 12, wherein the interpolated timing recovery circuits further comprise a loop filter operable to filter the error signal, and a phase accumulator circuit operable to generate phase offset from an output of the loop filter.

14. The system of claim 1, wherein at least the plurality of analog to digital converters and the joint equalizer are implemented as an integrated circuit.

15. A method of processing data from an array-reader in a magnetic storage system, comprising:
- deriving a clock signal from a reference channel in a plurality of analog data channels from the array-reader;
- digitizing each of the plurality of analog data channels based on the clock signal to yield a plurality of digital data channels; and
- jointly equalizing the plurality of digital data channels in a multi-input single-output joint equalizer to yield an equalized output representing the data from the array-reader in the magnetic storage system.

16. The method of claim 15, further comprising amplifying the plurality of analog data channels before deriving the clock signal and digitizing.

17. The method of claim 15, further comprising interpolating between samples in non-reference channels in the plurality of digital data channels before jointly equalizing.

18. The method of claim 17, further comprising calculating a timing error for each of the non-reference channels in the plurality of digital data channels, wherein the interpolation reduces the timing errors.

19. The method of claim 18, wherein the timing error is calculated at least in part based on target output signals from a joint equalizer.

20. A storage system comprising:
- a storage medium;
- an array-reader head assembly disposed in relation to the storage medium and operable to provide an array of analog signals corresponding to information on the storage medium, one of the array of analog signals corresponding with a reference channel;
- a timing recovery circuit operable to generate a clock signal based on the analog signal for the reference channel;
- a plurality of analog to digital converters each operable to sample one of the array of analog signals based on the clock signal to yield a plurality of digital channels; and
- a joint equalizer operable to filter the plurality of digital channels to yield an equalized output, the joint equalizer comprising a multi-input single-output filter.

* * * * *